(No Model.)
H. R. FRISBIE.
SWIVEL CONNECTION FOR VALVES AND THEIR SPINDLES.
No. 324,676. Patented Aug. 18, 1885.
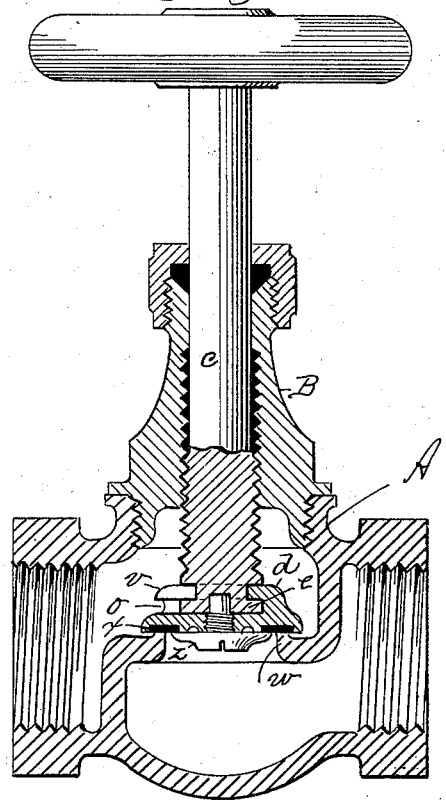
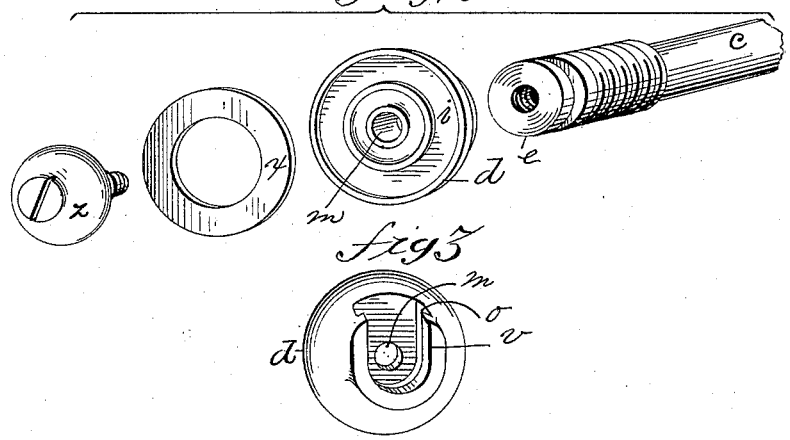
WITNESSES:
INVENTOR
Henry R Frisbie
BY
Henry A Chapin
ATTORNEY

UNITED STATES PATENT OFFICE.

HENRY R. FRISBIE, OF CROMWELL, ASSIGNOR TO THE PRATT & CODY COMPANY, OF HARTFORD, CONNECTICUT.

SWIVEL-CONNECTION FOR VALVES AND THEIR SPINDLES.

SPECIFICATION forming part of Letters Patent No. 324,676, dated August 18, 1885.

Application filed March 16, 1885. (No model.)

*To all whom it may concern:*

Be it known that I, HENRY R. FRISBIE, a citizen of the United States, residing at Cromwell, in the county of Middlesex and State of Connecticut, have invented new and useful Improvements in Swivel-Connections for Valves and Spindles, of which the following is a specification.

This invention relates to improvements in swivel-connections for valves and their spindles, the object being to provide improved means for connecting valves to their spindles in globe-valves, stop-cocks, and other similar articles, whereby the valve is permitted to turn on the end of the spindle, or the spindle to turn in its valve-connection, after the valve becomes seated, and whereby the construction of such connections is much strengthened and simplified, and the valve and the spindle are disconnected one from the other with great facility.

In the drawings forming part of this specification, Figure 1 is a vertical section of a globe-valve having its spindle and valve connected by devices embodying my invention. Fig. 2 illustrates in detail in perspective the lower end of the valve-spindle, the valve, a packing-ring, and a screw whose use is hereinafter described. Fig. 3 is a perspective view of the valve.

In the drawings, A is the body of the globe-valve, having the usual seat, $w$, therein and provided with the hub B, in which the spindle $c$ is supported, and is turned to move it up and down by means of the screw-thread connection it has with the hub B.

The spindle $c$ has an annular groove formed therein near its lower end, whereby is made the laterally-projecting collar $e$ below said groove, and the lower end of the spindle has a hole in it, as shown. In spindles no larger above the collar $e$ than the part adjoining it the collar only would engage under the lip $v$ with the valve.

The valve $d$ has a hole, $m$, centrally through it, which is provided with a screw-thread corresponding to that on the screw $z$, the latter being adapted to screw into the valve $d$, and its plain unscrewed end above its screwed part to project above the upper face of the valve, as shown.

On the upper side of valve $d$ is formed a spindle-socket adapted to receive the lower end of the spindle $c$ and the collar $e$ on the latter. The spindle-socket referred to consists of a wall standing at right angles to the face of the valve, on the upper side thereof, of a height about equal to the thickness of the collar $e$ on the spindle, the main portion of said wall being concentric with the center of the hole $m$ in the valve, but having an opening on one side, as shown, and said wall is surmounted by an inwardly-projecting lip, $v$, of a thickness about equal to the groove in the spindle above collar $e$, whereby there is formed a socket, $o$, around under said lip, adapted to receive the collar $e$, while the lip itself enters the groove above the latter.

The spindle in Fig. 1 is attached to the valve by passing its collared end through the side opening in said socket to a central position over the hole $m$, and then securing it there by the screw $z$, as shown, the plain end of the latter entering the hole in the end of the spindle. Thus the valve is perfectly free to turn on the spindle, but is firmly locked thereon.

In certain valve constructions it is desirable to provide the side of the valve which is forced against the seat $w$ with a packing-ring of rubber or similar yielding material or of lead or similar soft metal, and where such a ring is required the face of the valve has a groove, $i$, to receive the packing-ring $x$, and the latter is held there by the screw $z$, whose head engages with the inner border of said ring, as shown in Fig. 1.

The above-described valve and ring arrangement facilitates the replacing of worn or burned out packing-rings with new ones.

The above-described improved stem and valve-connection is a very strong one, and can be made very economically in comparison with other means heretofore employed, for the valve can be cast with its spindle-socket substantially ready for receiving the end of the spindle, and for large valves the latter also may be cast sufficiently perfect to admit of their being applied to the valves without finishing.

What I claim as my invention is—

A swivel-connection for a valve and spindle, consisting of a spindle-socket on the valve having an opening at one side substantially as described, said socket having an inwardly-projecting lip surmounting its sides, a spindle having a collar thereon, said collar entering said socket beneath said lip, and a screw engaging with the valve and having its plain end entering the lower end of the spindle, combined and operating substantially as described.

HENRY R. FRISBIE.

Witnesses:
H. A. CHAPIN,
J. D. GARFIELD.